Sept. 21, 1937.　　　　S. COLETTA　　　　2,093,956
CAMERA
Filed May 5, 1937　　　3 Sheets-Sheet 1

Steve Coletta
INVENTOR
BY Victor J. Evans & Co.
ATTORNEYS

Sept. 21, 1937.  S. COLETTA  2,093,956
CAMERA
Filed May 5, 1937  3 Sheets-Sheet 2
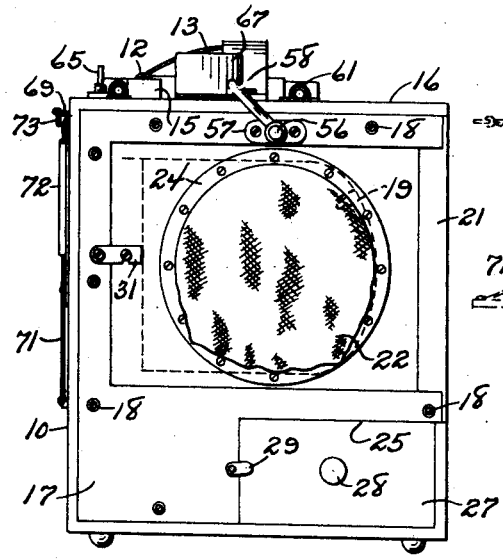
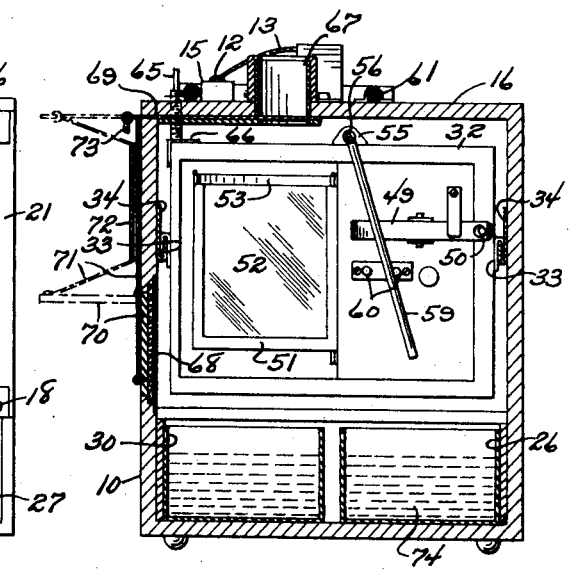
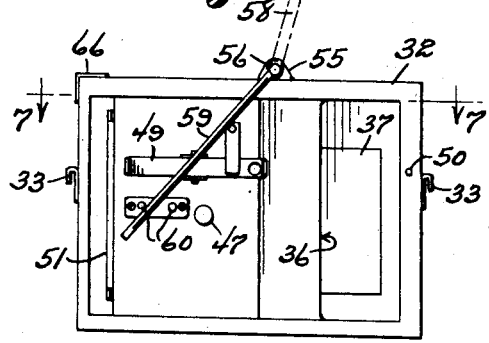
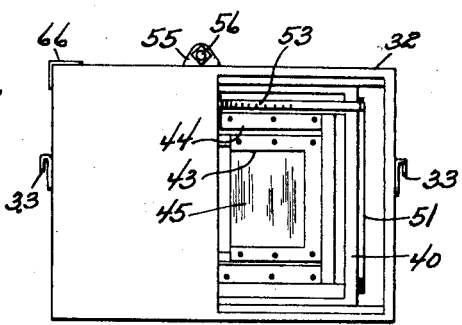
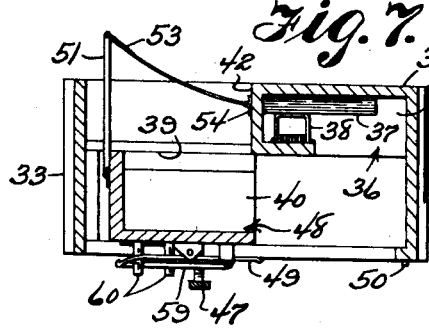
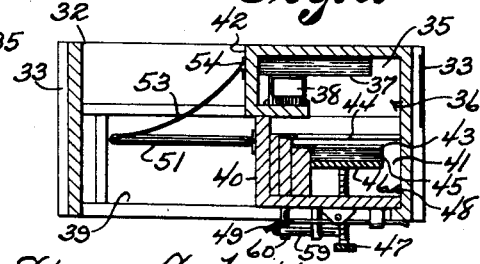
Steve Coletta INVENTOR
BY Victor J. Evans & Co.
ATTORNEYS Sept. 21, 1937.   S. COLETTA   2,093,956
CAMERA
Filed May 5, 1937   3 Sheets-Sheet 3

Steve Coletta   INVENTOR
BY Victor J. Evans & Co.
ATTORNEYS

Patented Sept. 21, 1937

2,093,956

UNITED STATES PATENT OFFICE 2,093,956

CAMERA

Steve Coletta, Brooklyn, N. Y.

Application May 5, 1937, Serial No. 140,918

14 Claims. (Cl. 95—13)

The invention relates to a camera and more especially to a photographic machine.

The primary object of the invention is the provision of a machine of this character, wherein both negative and positive photographs are made, these being had on bromide sensitized paper developed and fixed both interiorly of said machine.

Another object of the invention is the provision of a machine of this character, wherein the photographic print made within the machine, whether a negative or a positive, may be either a small or large print, the sizes being from one and three-fourths by two and one-half; two and one-half by three and one-half or postcard size and five by seven or larger at the option of the user of the camera, the developing and fixing being effected in a novel manner interiorly of the machine whether it be in the light or in darkness.

A further object of the invention is the provision of a machine of this character, wherein the focusing of the subject to be photographed is had in a novel manner and the carriage for the ground glass supports holders of different sizes with respect to each other for the photographic paper so that by adjustment different sizes of photographs may be had and thus eliminating the use of separate adapters or holders and the placing of the same in the machine.

A still further object of the invention is the provision of a machine of this character, wherein a hanger for a negative print is arranged for the support thereof so that positive prints of the same may be made and finished with dispatch.

A still further object of the invention is the provision of a machine of this character, wherein the construction thereof is novel in its entirety and will enable the making of negative and positive prints of a subject to be photographed with dispatch and without the necessity of developing and finishing these prints in a dark room or other enclosure as such prints will be developed and finished interiorly of the machine, the handling of the prints for this purpose being carried forth in a unique manner without liability of becoming light struck during such period.

A still further object of the invention is the provision of a machine of this character, which is simple in construction, thoroughly reliable and efficient in operation, readily and easily manipulated, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 3 is a rear elevation partly in section.

Figure 4 is a sectional view taken on the line 4—4 of Figure 1 looking in the direction of the arrows.

Figure 5 is a rear elevation of the carrier for the ground glass and sensitized or photographic sheets for negative and positive photographic prints.

Figure 6 is a front elevation of said carrier.

Figure 7 is a sectional view on the line 7—7 of Figure 5 looking in the direction of the arrows.

Figure 8 is a view similar to Figure 7 showing the print holder in a shifted or adjusted position from that shown in Figure 7.

Similar reference characters indicate corresponding parts throughout the several views in the drawings.

Figure 1:
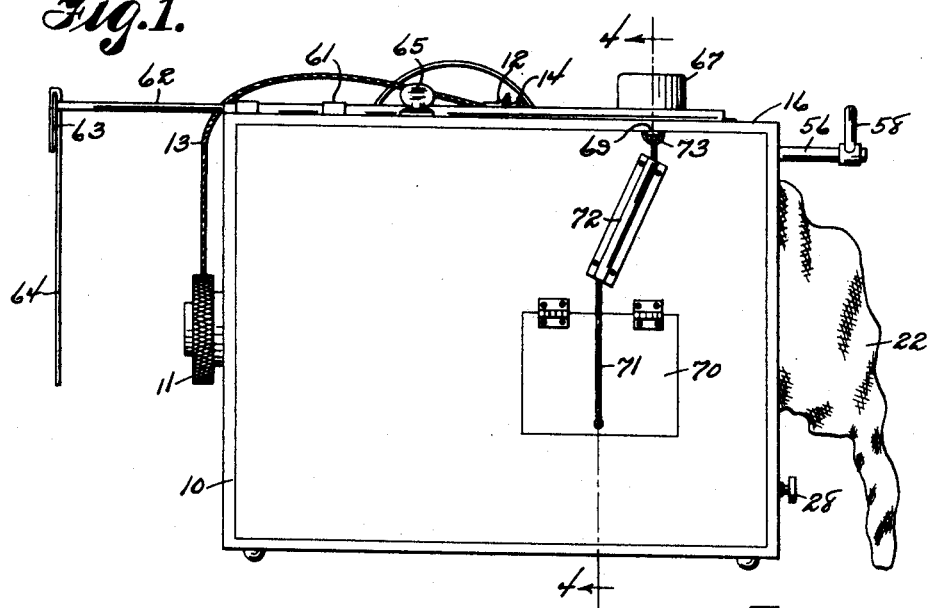
Figure 1 is a side elevation of a camera or machine constructed in accordance with the invention.
Figure 2:
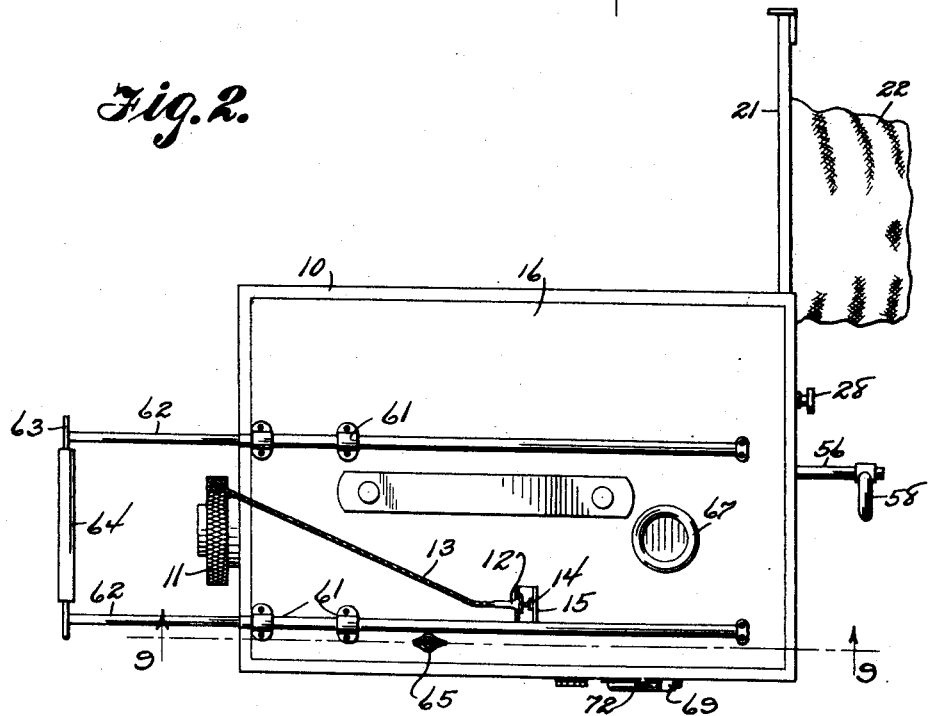
Figure 2 is a top plan view thereof.
Figure 9:
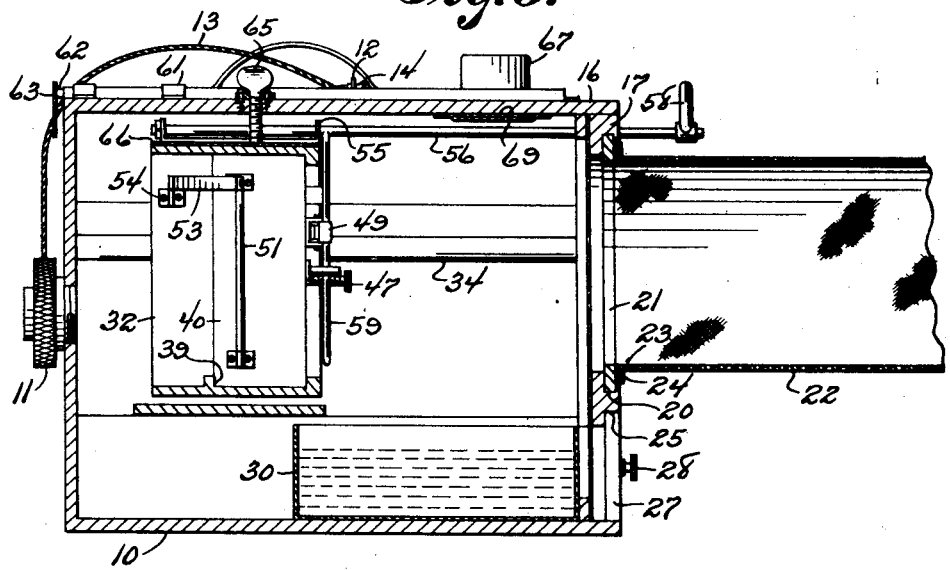
Figure 9 is a sectional view on the line 9—9 of Figure 2 looking in the direction of the arrows.
Figure 10:
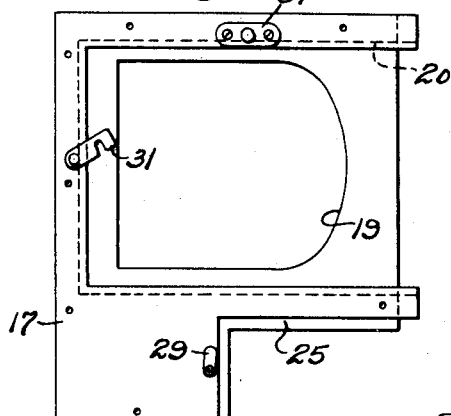
Figure 10 is an elevation of the rear end cover for the body of the machine.
Figure 11:
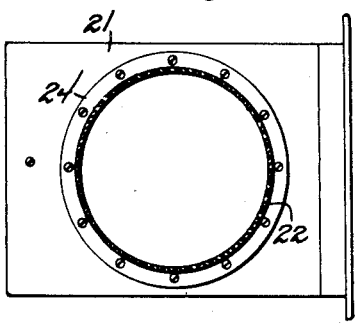
Figure 11 is an elevation partly in section of a slide fitting said cover and carrying the sleeve or hood for receiving the hand and arm of a user of the machine.
Figure 12:
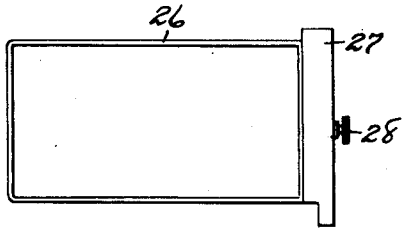
Figure 12 is a plan view of a drawer-like developing tray removed from the machine.

Referring to the drawings in detail, the camera or photographic machine comprises a box-like body 10 at its front end, a lens and shutter barrel 11 which is disposed laterally to one side of said body with respect to its longitudinal center, the shutter mechanism (not shown) of the usual opening and closing blade type being operated by a push plunger 12 of the usual flexible type fitted within a flexible tubular casing 13 and the button terminal 14 of this plunger 12 when pressed for the opening of the shutter mechanism can be held in this position by the engagement of the said casing 13 at its end next to the button 14 and the latter within a clip 15 built exteriorly of the body 10 on its top 16 so that the shutter mechanism will remain open for the focusing operation of the camera or machine, thereby eliminating the holding of the plunger 12 in the hand of the user of the camera after depressing the button 14. When the button 14 is released from the clip 15 and pressure is relieved therefrom, the shutter mechanism automatically closes as is customary.

The body 10 is permanently closed at its bottom, side, top and front end while the rear end is open and accommodates therein a rear cover 17 which is removably secured in place by fasteners 18. This cover has formed therein a window 19 for focusing purposes while built in this cover is a guide way 20 for a slide 21 carrying a flexible sleeve or hood 22 of tubular outwardly tapered formation being open at its outer smaller end for the reception of the hand and arm of a user of the camera or machine while the inner open end 23 of this hood or sleeve 22 is made fast to the slide 21 by a ring 24 concentrically about an opening in the slide registering with said open end 23. This open end 23 on adjustment of the slide 21 permits access to the interior of the camera or machine or its body 10 through the window 19 for a purpose presently described.

The cover 17 at one lower corner area thereof is cut into to provide an opening 25 for a slide drawer-like developing tray 26 carrying a closure piece 27 for the said opening 25 and this piece is equipped with a hand hold 28 so that the tray 26 can be pushed through the opening 25 into the body 10 or pulled outwardly therefrom. The closure piece when fitting the opening 25 may be fixedly held by a latch 29 on the cover 17.

Interiorly of the body 10 and resting upon its bottom to one side of the tray 26 is a removable fixing or finishing tray 30, the removal being had through the opening 25 when the tray 26 has been taken out of the body 10. These trays 26 and 30 when filled with a developing solution and a fixing or finishing solution and within the body 10 are accessible by the hand of a user of the camera when passed through the sleeve or hood 22 so that photographic developments and finishing may be carried forth interiorly of the camera or machine as will be hereinafter more fully described in detail.

The cover 17 carries a latch 31 for the fastening of the slide 21 when pushed fully inwardly in the guide way 20. When the said slide 21 is unlatched and pulled outwardly from the guide way 20, the window 19 is accessible for focusing purposes in the use of the camera or machine.

Arranged interiorly of the body 10 is a carriage in the form of an open frame 32 having at opposite sides thereof runners 33 engaged with tracks 34 stationarily mounted on the inner faces of opposite sides of the body 10 and disposed longitudinally of the said body. Formed within the frame 32 for substantially one-half of its width and also for less than one-half of its length is a holding pocket 35 which opens rearwardly at 36 of the said frame 32 and constitutes a storage space for sensitized or photographic sheets or prints 37, these being of a determined size and are held stacked or in a pack by a spring clip 38 for hand removal from the pocket 35 through the opening 36 for a purpose presently described.

Within the frame 32 immediately rearwardly of the pocket 35 and slidable transversely of the frame in a guide way 39 is a shiftable photographic sheet or print holder 40 and constituting a pocket 41 opening forwardly with respect to the frame 32. The frame 32 for the approximate remaining half of its width at one side of the pocket 35 in confronting relation to the lens and shutter barrel 11 provides a focusing and exposure way or opening 42 and the holder 40 being shiftable into and out of the path of the latter in a manner presently described.

The holder 40 in the pocket 41 has built therein varying sized racks 43 and 44, respectively. The rack 43 accommodates sensitized or photographic sheets or prints 45, these being stacked or packed within the pocket 41 and are backed by a follower plate 46 controlled by an adjusting screw 47 projecting rearwardly from the holder 40 and accessible within the body 10 at the rear thereof. The sheets or prints 45 are of a smaller size than the sheets or prints 37, the rack 44 being adapted to accommodate the latter forwardly of the stack or pack of sheets or prints 45. Therefore, according to the racking of the different sizes of sheets or prints in the holder 40 an exposure selectively in accordance therewith can be made for the making of a negative or positive photographic print. The pocket 35 is readily accessible within the body 10 from the back of the latter through the opening 36 while the pocket 41 in the holder 40 is readily accessible at the back of the body 10 within the latter through the side and front opening 48 in said holder 40 giving access to the sheets or prints of the stacks or packs therein.

The closed back of the holder 40 carries a hand released snap latch 49 for engagement with a keeper 50 on the frame 32 so that the said holder 40 can be latched out of the path of the way 42 for focusing operation as will be hereinafter fully described. The holder 40 when shifted into the path of the way 42 is for effecting an exposure for the taking of a negative or positive print.

Hinged on the holder 40 for horizontal swing is a sash 51 carrying a ground glass or focusing window 52 while pivoted to the upper end of the said sash is a turning link 53 which is also pivoted at 54 to the holding pocket 35 so that when the holder 40 is shifted out of the path of the way 42, the ground glass 52 in the sash 51 will be swung into the path of the way 42 whereby focusing of a subject to be photographed may be had through the window 19 when uncovered by the slide 21. On the shifting of the holder 40 into the path of the way 42, the ground glass 52 in the sash 51 is caused to swing forwardly and laterally out of the path of the way 42 so that a photographic exposure may be had in that the sensitized sheet or print will be in the holder 40 in an exposing position at the way 42 in the frame 32.

Journaled in suitable bearings 55 at the top of the frame 32 is a turnable rod or shaft 56 which is slidable through a guide 57 carried by the cover 17 to project without the body 10 and this outer projected end of the rod or shaft is fitted with a crank or handle 58 while at the rear of the frame 32 and projected at right angles from the said shaft or rod 56 is an arm 59 which on the turning of the shaft or rod arcuately swings and alternately engages with abutments or contact pins 60, the arm being located between the latter and in this manner the holder 40 is shiftable into or out of the path or way 42 while by pushing or pulling upon the shaft or rod 56 the frame 32 can be moved on the track 34 so as to permit the adjustment of the frame for sharp and accurate focusing during the use of the ground glass 52 when in the path of the way 42.

Arranged on the top 16 of the body 10 are fittings 61 for a negative print hanger 62 which projects beyond the front of the body 10 and at the foremost end of this hanger is a holder piece 63 for separable fastening therein of a negative photograph subject print or sheet 64 for confronting the lens within the barrel or casing 11 for the photographing of this print subject and the making of a positive photographic print therefrom either of a small size or an enlargement of the same.

Threaded in the top 16 of the body 10 is a set screw 65 to engage a binding plate or rail 66 on the frame 32, the purpose of these being to enable the holding of the frame 32 in an adjusted position after the focusing of a photographic subject in the making of a negative or positive print or picture.

Arranged in the top 16 of the body 10 is an inspection or peep sight 67 while at one side of the body is a red glass paneled window or opening 68, the sight 67 and the said window 68 for the admission of light to the interior of the said body 10. The sight 67 is normally closed by a slide 69 while the window or opening 68 is normally closed by a hinged door 70, both being connected to each other by a cord or cable 71 operating through a conduit 72 fixed exteriorly on the body 10 so that when the slide 69 is opened or closed the door 70 simultaneously opens or closes therewith. The slide 69 at its outer end has a handle 73 so that it can be manually manipulated for the opening and closing thereof.

The sleeve or hood 22 when not in use is collapsed or contracted in a manner to eliminate the passage of light therethrough and this is also true when the arm of a user of the camera has been inserted therein for the handling of the photographic sheets or prints in the developing and finishing thereof interiorly of the camera or machine.

After an exposure for the taking of a photographic print either as a negative or a positive the said exposed print is removed from its rack either 44 or 43 by hand, the operator of the camera having passed his hand through the hood or sleeve 22 into the body 10 and this removed print is placed within the developing tray 26 to be acted upon by the developing solution 74 therein. During the developing period the operator of the camera can readily make inspection of the work or the print by the opening of the slide 69 for the use of the sight 67 and the opening of the door 70 for admitting light through the window or opening 68 to the interior of the body 10 and using the sight 67 for view or inspecting the work or print. When development occurs the developed print is placed in the tray 30 for the finishing or fixing of such developed print and thereafter removed from the machine or camera, being extracted through the removal of the proper tray therefrom, that is, the one having the fixing solution at the right hand side of the camera looking toward its back. All joints in the machine or camera are light type so that the prints can not be light struck when photographing, development and the finishing of the work.

After the making of a negative print, the same is placed in the hanger 62 at the clip 63 thereof and a positive print is had therefrom by exposure of the latter, the negative print 64 being hung in confronting relation to the lens within the barrel 11, the print for the positive being shifted into the way 42 on the sliding of the holder 40 into the path of said way, the shutter mechanism being operated in a manner as hereinbefore set forth or in the conventional manner for the making of an exposure by the camera or machine.

In the use of this machine the photographs or prints are finished very rapidly in that the taking, developing and fixing can be had in approximately three minutes' time. The camera is serviceable for street work or within a studio or any other place selected by the user.

What is claimed is:

1. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, and a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism.

2. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, and a rear cover piece for the body and having an opening for viewing the focusing element.

3. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, and liquid holding trays removably fitted within the body below the carriage and rearwardly thereof.

4. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, and manually controlled means connected with the carriage for the shifting thereof on the track.

5. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, manually controlled means connected with the carriage for the shifting thereof on the track, and means included with the last-named means for operating the last-mentioned holder.

6. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, manually controlled means connected with the carriage for the shifting thereof on the track, means included with the last-named means for operating the last-mentioned holder, and means for latching the last-mentioned holder in alignment with the first-mentioned holder.

7. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, manually controlled means connected with the carriage for the shifting thereof on the track, means included with the last-named means for operating the last-mentioned holder, means for latching the last-mentioned holder in alignment with the first-mentioned holder, and a hand and arm receiving hood removably attached to the said cover and communicative with the interior of said body through the opening therein.

8. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, manually controlled means connected with the carriage for the shifting thereof on the track, means included with the last-named means for operating the last-mentioned holder, means for latching the last-mentioned holder in alignment with the first-mentioned holder, a hand and arm receiving hood removably attached to the said cover and communicative with the interior of said body through the opening therein, and means for separably fastening photographic material stacked within both holders.

9. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, manually controlled means connected with the carriage for the shifting thereof on the track, means included with the last-named means for operating the last-mentioned holder, means for latching the last-mentioned holder in alignment with the first-mentioned holder, a hand and arm receiving hood removably attached to the said cover and communicative with the interior of said body through the opening therein, means for separably fastening photographic material stacked within both holders, and differently sized racks within the last-mentioned holder for photographic material.

10. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, manually controlled means connected with the carriage for the shifting thereof on the track, means included with the last-named means for operating the last-mentioned holder, means for latching the last-mentioned hold in alignment with the first-mentioned holder, a hand and arm receiving hood removably attached to the said cover and communicative with the interior of said body through the opening therein, means for separably fastening photographic material stacked within both holders, differently sized racks within the last-mentioned holder for photographic material, a peep tube fitting the body, and a slide gate closing said tube.

11. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, manually controlled means connected with the carriage for the shifting thereof on the track, means included with the last-named means for operating the last-mentioned holder, means for latching the last-mentioned holder in alignment with the first-mentioned holder, a hand and arm receiving hood removably attached to the said cover and communicative with the interior of said body through the opening therein, means for separably fastening photographic material stacked within both holders, differently sized racks within the last-mentioned holder for photographic material, a peep tube fitting the body, a slide gate closing said tube, and a red glass paneled window built in said body for admitting red light within the interior of said body.

12. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, manually controlled means connected with the carriage for the shifting thereof on the track, means included with the last-named means for operating the last-mentioned holder, means for latching the last-mentioned holder in alignment with the first-mentioned holder, a hand and arm receiving hood removably attached to the said cover and communicative with the interior of said body through the opening therein, means for separably fastening photographic material stacked within both holders, differently sized racks within the last-mentioned holder for photographic material, a peep tube fitting the body, a slide gate closing said tube, a red glass paneled window built in said body for admitting red light within the interior of said body, and a door for closing said window.

13. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, manually controlled means connected with the carriage for the shifting thereof on the track, means included with the last-named means for operating the last-mentioned holder, means for latching the last-mentioned holder in alignment with the first-mentioned holder, a hand and arm receiving hood removably attached to the said cover and communicative with the interior of said body through the opening therein, means for separably fastening photographic material stacked within both holders, differently sized racks within the last-mentioned holder for photographic material, a peep tube fitting the body, a slide gate closing said tube, a red glass paneled window built in said body for admitting red light within the interior of said body, a door for closing said window, and connections between the slide and door for simultaneous operation thereof.

14. A camera of the character described comprising a box-like body having a lens and shutter mechanism located at one end and to one side of the longitudinal axis thereof, tracks interiorly of the body and disposed longitudinally of the same, a carriage movable on said tracks, a photographic material holder permanent in said carriage out of alignment with said lens and shutter mechanism, a photographic material holder slidably fitting the carriage and movable to alignment with the first-mentioned holder and the lens and shutter mechanism, a focusing element carried by the last-mentioned holder and connected with the first-mentioned holder for movement into and out of alignment with the lens and shutter mechanism on the shifting of the last-mentioned holder alternately into alignment with the first-mentioned holder and in alignment with the lens and shutter mechanism, a rear cover piece for the body and having an opening for viewing the focusing element, liquid holding trays removably fitted within the body below the carriage and rearwardly thereof, manually controlled means connected with the carriage for the shifting thereof on the track, means included with the last-named means for operating the last-mentioned holder, means for latching the last-mentioned holder in alignment with the first-mentioned holder, a hand and arm receiving hood removably attached to the said cover and communicative with the interior of said body through the opening therein, means for separably fastening photographic material stacked within both holders, differently sized racks within the last-mentioned holder for photographic material, a peep tube fitting the body, a slide gate closing said tube, a red glass paneled window built in said body for admitting red light within the interior of said body, a door for closing said window, connections between the slide and door for simultaneous operation thereof, the said cover being formed with an opening for admission and removal of the trays to and from the body, and a closure piece on one tray for the last-mentioned opening.

STEVE COLETTA.